United States Patent [19]

El Bindari

[11] 4,167,222

[45] Sep. 11, 1979

[54] PASSIVE ANTI-THEFT DEVICE

[75] Inventor: Ahmed El Bindari, Brookline, Mass.

[73] Assignee: Guardex Corporation, Salem, Mass.

[21] Appl. No.: 851,555

[22] Filed: Nov. 14, 1977

[51] Int. Cl.² .............................................. B60R 25/02
[52] U.S. Cl. ..................................... 180/287; 70/237; 70/417
[58] Field of Search .................... 180/114; 70/237, 417

[56] References Cited

U.S. PATENT DOCUMENTS

| 1,590,981 | 6/1926 | Lockyer | 70/237 |
| 3,083,563 | 4/1963 | Greenwald | 70/417 |
| 3,811,303 | 5/1974 | Robertson | 70/237 |
| 3,916,658 | 11/1975 | Barry | 180/114 X |

Primary Examiner—Albert J. Makay
Assistant Examiner—Terrance L. Siemens

Attorney, Agent, or Firm—David E. Brook

[57] ABSTRACT

An anti-theft device for positioning over the ignition housing of a vehicle's steering column to protect ignition and anti-theft components contained therein is disclosed. This device has armored guard means including a band which extends around the ignition housing, a cylindrical portion to protect the ignition key cylinder housing, and a cover with an ignition key slot therethrough. Means for fastening the armored guard onto the steering column in a permanent manner are also provided. This anti-theft device is passive, aesthetically pleasing, economical to manufacture, has an extremely low likelihood of mechanical failure and yet is capable of providing outstanding protection against forced entry into the ignition and anti-theft components of a vehicle.

17 Claims, 5 Drawing Figures

PASSIVE ANTI-THEFT DEVICE

BACKGROUND OF THE INVENTION

1. Field of the Invention

This invention is in the field of anti-theft devices for protecting ignition and anti-theft components contained within the steering column of a vehicle.

2. Description of the Prior Art

Recently, automobiles and other vehicles have been manufactured with their ignition and anti-theft components located within the steering column. This provides an opportunity to employ a variety of anti-theft measures. For example, the ignition key itself can be used to lock and unlock the steering wheel. Additionally, removal of the ignition key may cut current flow and ground the ignition so that it can't be hot-wired.

Despite these safeguards, ignition component housings on steering columns have traditionally been made from zinc diecast. While this is economical, it does not provide the strength required to thwart efforts to break into the ignition components located within a vehicle's steering column. A hard blow with a hammer, for example, is often sufficient to smash zinc diecast ignition housings. Additionally, it is sometimes possible to use a self-tapping screw device to bore into the ignition key cylinder and yank it away thereby exposing ignition components.

One type of proposed anti-theft device proposed to overcome these problems is a strong band-type device for positioning over the ignition component housing. Typically, such devices have been "active" devices, i.e., devices which require removal of a cover before the ignition key can be inserted. Usually, a first key is used to remove the cover, and then the ignition key can be inserted. Such devices are cumbersome, time-consuming, and unattractive, and have not been widely accepted. Furthermore, these types of devices can present an additional safety hazard because at least one component has to be removed and this component can be left loose in the vehicle and thereby become a potential flying object if the vehicle undergoes sudden acceleration or deceleration.

It would be a great advantage, therefore, to have a vehicle anti-theft device which offered the same degree of protection offered by these types of active anti-theft devices without their concomitant problems.

SUMMARY OF THE INVENTION

This invention relates to a passive anti-theft device which guards ignition components located within a housing on a vehicle's steering column from forced entry. By passive is meant an anti-theft device that is permanently installed and does not require additional steps beyond those normally required to start the engine of a vehicle.

In particular, this anti-theft device has armored guard means, including a band portion which can extend around the steering column over the ignition housing. It also contains a cylindrical portion which is located around the ignition key cylinder housing and a cover over the cylindrical portion. This cover contains an ignition key slot and it can be rotated to allow a key inserted therethrough to rotate the ignition key cylinder. Thus, the ignition components are entirely surrounded and protected by the armored guard means.

Means for permanently fastening the armored guard means around that portion of the vehicle's steering column containing the ignition and anti-theft components are provided. In one embodiment, the cylindrical portion of the armored guard means is split in half and the means for permanently fastening includes a ring which fits onto a tapered lip on the split cylindrical portion of the armored guard means. This ring can be screwed into the armored guard means to hold it in position around the ignition housing. The ring also has an exterior groove for receiving dowel pins from the cover over the cylindrical portion.

In an alternative embodiment, the band portion of the armored guard means is split rather than the cylindrical portion. In this embodiment, the means for permanently fastening comprises rivets or other such means for permanently joining the split portions of the band. Also, the cover is mounted by positioning dowel pins in a groove on the outer surface of the cylindrical portion.

Thus, there is provided a passive anti-theft device which can be formed from steel and subsequently case hardened to provide outstanding protection against forced entry. Yet, the device can be made aesthetically pleasing by chrome plating the cover and fabricating the other components to blend with the original equipment. The probability of mechanical failure is very low with this device. Once installed, the anti-theft device is permanent in the sense that the dowel pins or other fastening means have to be destroyed to remove it. Because of its unique design, forced entry is extremely difficult and unlikely to occur.

DESCRIPTION OF PREFERRED EMBODIMENTS

Figure 1:
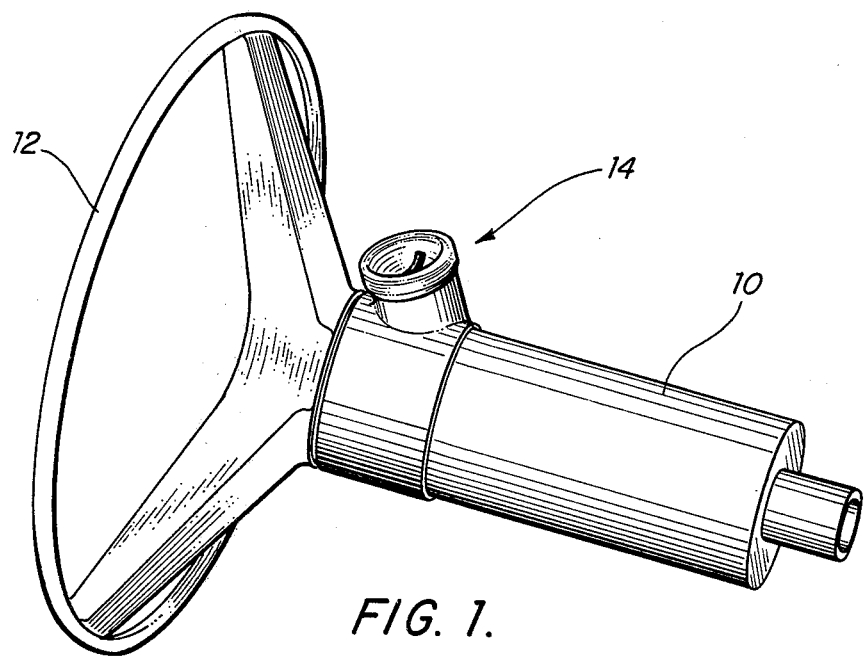
FIG. 1 is a perspective view of a vehicle's steering column with a first embodiment of an anti-theft device according to this invention mounted thereon.

In FIG. 1, a typical vehicle steering post or column 10 with a steering wheel 12 thereon is illustrated. In addition to containing steering components, steering column 10 contains the ignition components for the vehicle. Typically, the ignition and anti-theft components are located immediately below the steering wheel in a zinc diecast housing. In FIG. 1, one embodiment of a passive anti-theft device 14 according to this invention is shown surrounding the housing for ignition and anti-theft components.

Figure 2:
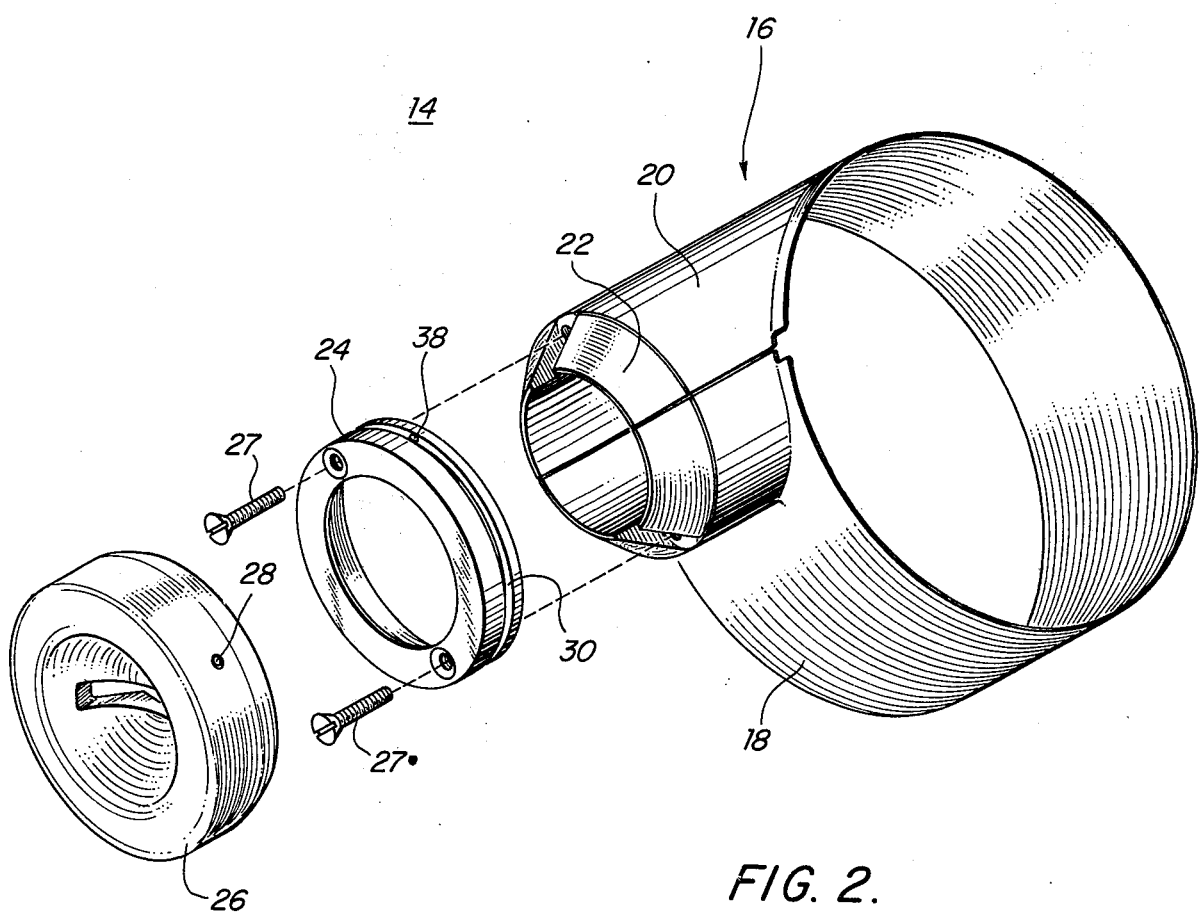
FIG. 2 is an exploded view showing the various components of the first embodiment of an anti-theft device according to this invention.

FIG. 2 shows the various components of device 14 illustrated in FIG. 1 in more detail. Thus, it can be seen that there is an armored guard 16 which includes a band portion 18 and a split cylindrical portion 20. Band portion 18 is designed to fit around steering column 10, such as directly over the housing for ignition and anti-theft components. Split cylindrical portion 20 is integral with band portion 18 and is designed to fit around the ignition key cylinder housing. At the top of cylindrical portion 20, a tapered lip 22 is shown which is used to mount ring 24 on cylindrical portion 20. Ring 24 is attached to the armored guard 16 by screws 27 which can be inserted through the screw holes in ring 24 and fastened into the upper rim of cylindrical portion 20 of armored guard 16.

Another component in this embodiment is key cover 26 which has a slotted keyhole through it. The slotted keyhole is designed just wide enough to accept the ignition key and to allow it to pass through cover 26 to the ignition key cylinder contained within the steering column. Cover 26 replaces the winged cover of the ignition key cylinder which assists in turning the ignition key. This winged cover is easily removable from original equipment. Cover 26 must be formed from a material such as steel that can be case-hardened to make it tough and difficult to destroy. In fact, once cover 26 has been case-hardened, the insertion of a self-tapping screw device to remove cover 26 becomes ineffective because the threads of the screw are stripped as it is inserted through the keyhole. Cover 26 is attached to guard 16 by dowel pins 28 extending through the inner wall of cover 26 and terminating in a groove 30 positioned on the exterior of ring 24. Dowel pins 28 also allow the cover to rotate as the ignition key is turned.

Figures 3, 4, 5:
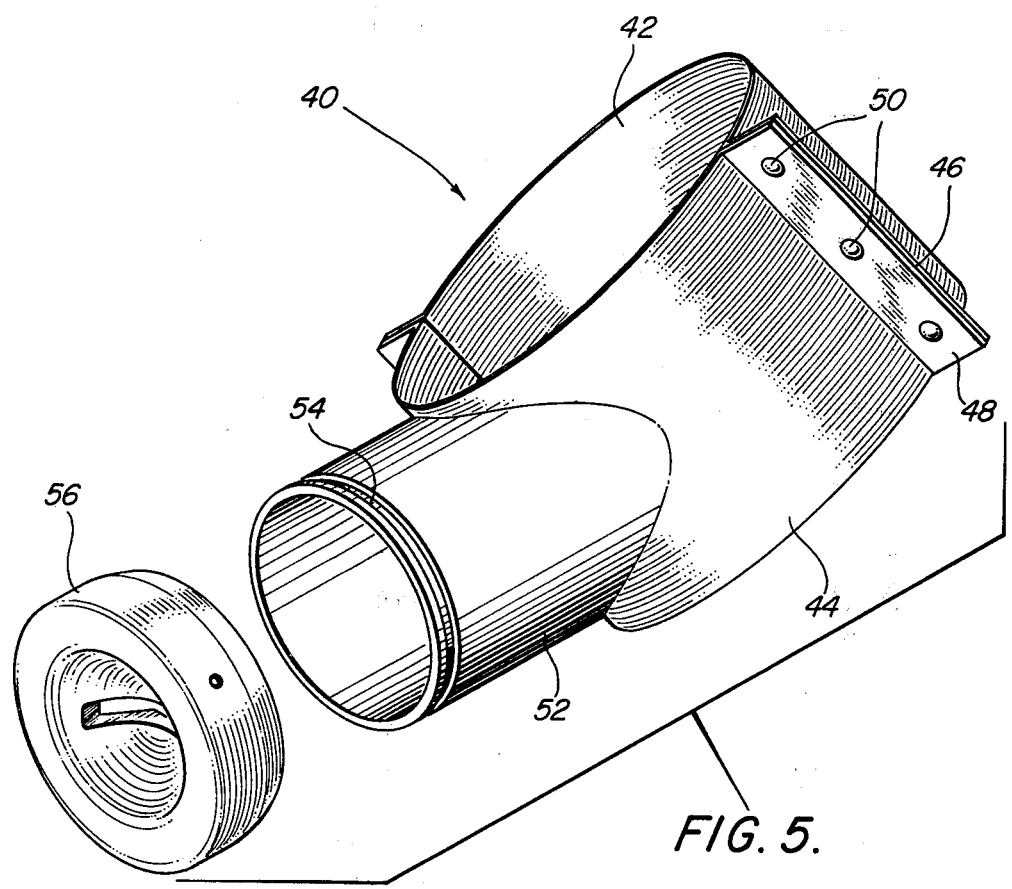
FIG. 3 is a cross-sectional elevational view of a ring for fastening the armored guard into position in the first embodiment.
FIG. 4 is a cross-sectional elevation view of a key cover.
FIG. 5 is a perspective view of a second embodiment of an anti-theft device according to this invention.

In FIG. 3, a cross-sectional elevational view of ring 24 is shown. In this view, it can be seen that the inner surface 32 of ring 24 is tapered. This taper is complementary to the taper of lip 22 on cylindrical portion 20 of armored guard 16. Thus, the tapered inner surface 32 of ring 24 is designed to mate with tapered lip 22 on guard 16.

In FIG. 4, a cross-sectional elevational view of cover 26 is shown. As can be seen, cover 26 has a generally circular shape with a recessed portion 37 on its outer surface where the ignition key slot is positioned. Dowel pins 28 extend through the side wall of cover 26 and into groove 30 on ring 24. Dowel pins 28 are inserted far enough into groove 30 on ring 24 to permanently fasten cover 26 thereon but not far enough to prevent rotation of cover 26. Stop 38 is positioned in groove 30 to act as a stop for this rotation.

FIG. 5 illustrates an anti-theft device which is an alternative embodiment to that of FIG. 1. In this embodiment, the device has an armored guard 40 which is split into two band portions, 42 and 44. Split band portions 42 and 44 have raised lips 46 and 48 which can be joined by rivets 50 or other similar permanent joining means. Cylindrical portion 52 has a groove 54 therein for receiving dowel pins from key cover 56. The band of guard 40 can be split in one, two or more portions, as desired. In this embodiment, raised lips 46 and 48 together with rivets 50 form part of the means for permanently fastening the armored guard 40 to a steering column. Cover 56 has a recessed portion deep enough to allow the ignition key to extend into the ignition key cylinder.

The anti-theft device of this invention can be installed during or subsequent to vehicle manufacture. Its precise dimensions and tolerances are designed for the particular vehicle upon which it will be installed.

Those skilled in the art will recognize, or be able to determine using no more than routine experimentation, other suitable equivalents to the embodiments actually described herein. Such embodiments are intended to be covered by the following claims.

What is claimed is:

1. A passive anti-theft device for protecting ignition or anti-theft components mounted within the steering column of a vehicle from forced entry, comprising, in combination:
   a. armored guard means for protecting said components within a vehicle steering column but permitting an ignition key to be inserted into an ignition key cylinder contained within the vehicle steering column, said armored guard means including a band portion which can be positioned around the ignition housing of a steering column, an integral cylindrical portion which can be positioned around an ignition key cylinder housing, and a cover; and
   b. means for permanently fastening said armored guard means around that portion of a vehicle steering column containing said components, said means for permanently fastening including:
      a tapered lip on the upper surface of the cylindrical portion of said armored guard means;
      a circular ring having a taper on its inside surface complementary to that of said tapered lip whereby the circular ring can be positioned upon said tapered lip, and
      means to fasten said circular ring to said armored guard means.

2. A device of claim 1 wherein said armored guard means is fabricated from steel case-hardened to have a surface hardness of at least 60 on the Rockwell C scale.

3. A device of claim 2 wherein said steel is case-hardened to a depth of up to about 0.015 inches.

4. A device of claim 1 wherein said means to fasten said circular ring to said armored guard means comprise screws.

5. A device of claim 4 wherein said cover is permanently fastened to said ring by metal dowel pins extending from said cover into a groove positioned in the outer wall of said ring.

6. A device of claim 5 wherein said circular ring has a stop in the groove in its outer surface which acts as a stop for rotation of said cover.

7. A passive anti-theft device for protecting ignition or anti-theft components mounted within the steering column of a vehicle from forced entry, comprising, in combination:
   a. armored guard means for protecting said components within a vehicle steering column but permitting an ignition key to be inserted into an ignition key cylinder contained within the vehicle steering column, said armored guard means including a band portion which can be positioned around the ignition housing of a steering column, an integral split cylindrical portion which can be positioned around an ignition key cylinder housing, and a cover; and
   b. means for permanently fastening said armored guard means around that portion of a vehicle steering column containing said components, said means for permanently fastening including a circular ring and means to fasten said circular ring to said cylindrical portion.

8. A passive anti-theft device for protecting ignition or anti-theft components mounted within the steering column of a vehicle from forced entry, said anti-theft device comprising:
   a band for surrounding the ignition housing of a steering column;
   a cylinder integral with said band and positioned around an ignition key cylinder housing, said cylinder being split to permit positioning of the band around the steering column; and fastening means for fastening said split cylinder to hold said band and cylinder onto the steering column.

9. A passive anti-theft device as claimed in claim 8 wherein said fastening means comprises a ring for surrounding a portion of said split cylinder.

10. A passive anti-theft device as claimed in claim 9 further comprising a cover having a keyhole therein; said cover being associated with said ring and cylinder for rotary movement relative thereto.

11. A passive anti-theft device as claimed in claim 10 wherein said ring is joined to the end of said split cylinder and is overlapped by said cover.

12. A passive anti-theft device as claimed in claim 11 wherein the end surface of the said cylinder is tapered and said ring has a complementary taper on its end surface.

13. A passive anti-theft device as claimed in claim 11 wherein said cover is joined to said ring by dowel pins extending into a circumferential groove in said ring.

14. A passive anti-theft device as claimed in claim 8 further comprising a cover having a keyhole therein and associated with the cylinder for rotaty movement relative thereto, said cover being joined to said cylinder by dowel pins extending into a circumferential groove.

15. A passive anti-theft device as claimed in claim 8 wherein said band is a flat band continuous between the split elements of the cylinder.

16. A passive anti-theft device for protecting ignition or anti-theft components mounted within the steering column of a vehicle from forced entry, said anti-theft device comprising:
- a cylinder positionable around an ignition key cylinder housing; and
- a cover having a keyhole therein and associated with said cylinder for rotary movement relative thereto, said cover being joined to said cylinder by dowel pins extending into a circumferential groove.

17. A passive anti-theft device as claimed in claim 16 wherein the groove has a stop in its surface which acts as a stop for rotation of said cover.

* * * * *